(12) United States Patent
Yeh et al.

(10) Patent No.: US 7,505,533 B2
(45) Date of Patent: Mar. 17, 2009

(54) CLOCK DATA RECOVERY CIRCUIT WITH PHASE DECISION CIRCUIT

(75) Inventors: Tse-Hsien Yeh, Taipei (TW); Wei-Yu Wang, Taipei (TW)

(73) Assignee: Via Technologies, Inc., Taipei (TW)

( * ) Notice: Subject to any disclaimer, the term of this patent is extended or adjusted under 35 U.S.C. 154(b) by 598 days.

(21) Appl. No.: 11/288,787

(22) Filed: Nov. 29, 2005

(65) Prior Publication Data

US 2006/0115020 A1 Jun. 1, 2006

Related U.S. Application Data

(60) Provisional application No. 60/631,447, filed on Nov. 29, 2004.

(51) Int. Cl.
*H04B 17/00* (2006.01)
*H04Q 1/20* (2006.01)

(52) U.S. Cl. ................. 375/327; 375/328; 375/374; 375/375

(58) Field of Classification Search ........... 375/327, 375/371, 373, 376, 377
See application file for complete search history.

(56) References Cited

U.S. PATENT DOCUMENTS

| 7,409,031 B1* | 8/2008 | Lee et al. | 375/376 |
| 2002/0085656 A1* | 7/2002 | Lee et al. | 375/355 |
| 2004/0202266 A1* | 10/2004 | Gregorius et al. | 375/355 |

\* cited by examiner

*Primary Examiner*—Chieh M Fan
*Assistant Examiner*—Qutbuddin Ghulamali
(74) *Attorney, Agent, or Firm*—Thomas, Kayden, Horstemeyer & Risley

(57) ABSTRACT

A clock data recovery circuit with feedback type phase discrimination. The clock data recovery circuit has an output signal of B bits and comprises a sampler, a phase region decision circuit, a phase status register and a multiplexer. The sampler oversamples k*B bits per cycle from a data input signal according to a sampling clock signal. The phase region decision circuit generates a plurality of binary up-down decision signals according to the oversampled data input signal and a current phase status signal. The phase status register generates the current phase status signal according to the binary up-down decision signals. The multiplexer selects data of B bits from the oversampled data input signal according to the current phase status signal.

20 Claims, 15 Drawing Sheets

| FIG. 7A | FIG. 7B |
|---|---|
| ⋮ | ⋮ |
| S170 | S174 |
| S180 | S184 |
| S190 | S194 |
| S200 | S204 |
| S210 | S214 |
| S220 | S224 |
| S230 | S234 |
| S240 | S244 |
| S250 | S254 |
| S260 | S264 |
| S270 | S274 |
| S280 | S284 |
| S290 | S294 |
| S300 | S310 |
| S304 | S320 |
| S314 | S330 |
| S324 | S340 |
| S334 | S350 |
| S344 | S360 |
| S354 | S370 |
| S364 | S380 |
| S374 | S390 |
| S384 | S384 |
| S394 | S394 |
| S404 | S400 |
| S414 | S410 |
| S424 | S420 |
| ⋮ | ⋮ |

CLOCK DATA RECOVERY CIRCUIT WITH PHASE DECISION CIRCUIT

CROSS REFERENCE TO RELATED APPLICATIONS

This application claims the benefit of U.S. Provisional Application No. 60/631,447, filed on Nov. 29, 2004.

BACKGROUND OF THE INVENTION

1. Field of the Invention

The invention relates to clock data recovery and, in particular, to clock data recovery circuits with phase decision circuits.

2. Description of the Related Art

Some data streams, especially high-speed serial data streams, (such as the raw stream of data from the magnetic head of a disk drive) are sent without an accompanying clock. The receiver generates a clock from an approximate frequency reference, and phase-aligns to the transitions in the data stream with a phase locked loop (PLL). In order for this scheme to work, the data stream must have frequent enough transition to correct any drift in the PLL's oscillator. Thus, clock data recovery circuits can be a key circuit block in a receiver.

FIG. 1 shows a conventional clock data recovery circuit as disclosed in "A 0.5 um CMOS 4 Gbit/s Serial Link Transceiver with Data Recovery Using Oversampling", IEEE J. Solid-State Circuits, vol. 33, pp 713-722, May. 1998, by C. K. Yang and M. Horowitz. The clock data recovery circuit comprises a sampler 110, an XOR circuit block 120, a shift register 130, a voter 140, a multiplexer 150 and a post process logic circuit 160. The sampler 110 receives an input data stream IN and a sampling clock signal CLK. The XOR circuit 120 is coupled to the sampler 110 and receives the oversampled input data stream IN'. The shift register 130 is coupled to the XOR circuit block 120. The voter 140 is coupled to the shift register 130 and generates a voting result according to the oversampled input data stream IN'. The multiplexer 150 is coupled to the voter 140 and selects data from the oversampled input data stream IN' according to the voting result. Data processing of the selected data is performed by the post process logic circuit 160 and thus an output signal is provided. In this conventional clock data recovery circuit, number of voting needs to be large enough such that voting error rate is reduced. Hardware cost is also an issue.

FIG. 2 shows another conventional clock data recovery circuit as disclosed in "Multi-Gigabit-Rate Clock and Data Recovery Based on Blind Oversampling", IEEE Communication Magazine, pp. 68-74, December 2003, by J. Kim and D. K. Jeong. The clock data recovery circuit comprises a sampler 210, an XOR circuit block 220, a first voter 230, a shift register 240, a second voter 250, a multiplexer 260 and a post process logic circuit 270. The sampler 210 receives an input data stream IN and a sampling clock signal CLK. The XOR circuit 220 is coupled to the sampler 210 and receives the oversampled input data stream IN'. The first voter 230 is coupled to the XOR circuit block 220 and performs a first voting. The shift register 240 is coupled to the first voter 230 and receives the first voting result. The second voter 250 is coupled to the shift register 240 and generates a second voting result according to an output signal of the shift register 240. The multiplexer 260 is coupled to the second voter 250 and selects data from the oversampled input data stream IN' according to the second voting result. Data processing of the selected data is performed by the post process logic circuit 270 and thus an output signal is provided. In this conventional clock data recovery circuit, number of voting still needs to be large enough such that voting error rate is reduced. Hardware cost, while lower than in the previous conventional clock data recovery circuit, remains an issue.

BRIEF SUMMARY OF THE INVENTION

An embodiment of a clock data recovery circuit with feedback type phase decision generates an output signal of B bits and comprises a sampler, a phase region decision circuit, a phase status register and a multiplexer. The sampler oversamples k*B bits per cycle from a data input signal according to a sampling clock signal. The phase region decision circuit generates a plurality of binary up-down decision signals according to the oversampled data input signal and a current phase status signal. The phase status register generates the current phase status signal according to the binary up-down decision signals. The multiplexer selects data of B bits from the oversampled data input signal according to the current phase status signal. The multiplexer selects the data sampled in at a phase $\Phi n5$, wherein n5 is a modulus of nx5/k, and nx5 is a sum of k and m. The binary up-down decision signals comprise a first up signal, a first down signal, a second up signal, and a second down signal. The first up signal has a value of 1 if a phase region of the oversampled data input signal is Rn1, wherein n1 is a modulus of nx1/k, nx1 is one of n+1, n+2, . . . and n+ny1, and ny1 is one of 1, 2, . . . , and m. The first down signal has a value of 1 if a phase region of the oversampled data input signal is Rn2, wherein n2 is a modulus of nx2/k, nx2 is one of n,n−1, . . . and n−ny2, and ny2 is one of 0, 1, . . . , and m. The second up signal has a value of 1 if a phase region of the oversampled data input signal is Rn3, wherein n3 is a modulus of nx3/k, nx3 is one of n, n+1, . . . and n+ny3, and ny3 is one of 0, 1, . . . , and m. The second down signal has a value of 1 if a phase region of the oversampled data input signal is Rn4, wherein n4 is a modulus of nx4/k, nx2 is one of n−1, n−2, . . . and n−ny4, and ny4 is one of 1, 2, . . . , and m, wherein n is one of 0, 1, . . . , k−1 and m is an integer of (k−1)/2. The current phase status $\Phi n5$ is indicated by the current phase status signal.

Another embodiment of a clock data recovery circuit with feedback type phase decision has an output signal of B bits and comprises a sampler, a phase region decision circuit, a phase status register and a multiplexer. The sampler oversamples k*B bits per cycle from a data input signal according to a sampling clock signal. The phase region decision circuit generates a plurality of binary up-down decision signals according to the oversampled data input signal and a current phase status signal. The phase status register generates the current phase status signal according to the binary up-down decision signals. The multiplexer selects data of B bits from the oversampled data input signal according to the current phase status signal. The multiplexer selects the data sampled at a phase $\Phi n$. The binary up-down decision signals comprise an up signal and a down signal. The up signal has a value of 1 if a phase region of the oversampled data input signal is Rn1, wherein n1 is a modulus of nx1/k, nx1 is one of n−m+1, . . . and n−m+1+ny1, and ny1 is one of 0, 1, . . . , and m−1. The down signal has a value of 1 if a phase region of the oversampled data input signal is Rn2, wherein n2 is a modulus of nx2/k, nx2 is one of n+m,n+m−1, . . . and n+m−ny2, and ny2 is one of 0, 1, . . . , and m−1, wherein n is one of 0, 1, . . . , k−1 and m is an integer of k/2. The current phase status $\Phi n$ is indicated by the current phase status signal.

An embodiment of a phase region decision circuit comprises a phase region comparator and a statistical circuit. The phase region decision circuit receives an un-voted and over-sampled input signal from a sampling circuit. The sampling circuit includes a sampler and an XOR circuit block for checking data transition. The sampler over-sampling k*B bits per cycle from a serial input data stream IN according to a sampling clock signal CLK. The phase region decision circuit is coupled to a multiplexer which selects data of B bits from the over-sampled input data stream. The phase region decision circuit comprises a phase region comparator and a statistical circuit. The phase region comparator generates at least one set of up-down decision signals including a first up signal and a first down signal according to the over-sampled input data stream. The statistical circuit generates a set of phase-up and phase-down signals and to a phase status register which provides a current phase status signal coupled to the phase region comparator receiving the set of up-down decision signals and generating a current phase status signal to the phase region comparator for comparison and to the multiplexer for selectively outputting the over-sampled data from the sampling circuit corresponding to the current phase status signal. The multiplexer selects the data sampled in at a phase $\Phi n5$, wherein n5 is a modulus of nx5/k, and nx5 is a sum of k and m. The binary up-down decision signals comprise a first up signal, a first down signal, a second up signal, and a second down signal. The first up signal has a value of 1 if a phase region of the oversampled data input signal is Rn1, wherein n1 is a modulus of nx1/k, nx1 is one of n+1, n+2, ... and n+ny1, and ny1 is one of 1, 2, ..., and m. The first down signal has a value of 1 if a phase region of the oversampled data input signal is Rn2, wherein n2 is a modulus of nx2/k, nx2 is one of n,n−1, ... and n−ny2, and ny2 is one of 0, 1, ..., and m. The second up signal has a value of 1 if a phase region of the oversampled data input signal is Rn3, wherein n3 is a modulus of nx3/k, nx3 is one of n, n+1, ... and n+ny3, and ny3 is one of 0, 1, ..., and m. The second down signal has a value of 1 if a phase region of the oversampled data input signal is Rn4, wherein n4 is a modulus of nx4/k, nx2 is one of n−1, n−2, ... and n−ny4, and ny4 is one of 1, 2, ..., and m, wherein n is one of 0, 1, ..., k−1 and m is an integer of (k−1)/2. The current phase status $\Phi n5$ is indicated by the current phase status signal.

An embodiment of a phase region decision circuit comprises a phase region comparator and a statistical circuit. The phase region decision circuit receives an un-voted and over-sampled input signal from a sampling circuit. The sampling circuit includes a sampler and an XOR circuit block for checking data transition. The sampler over-sampling k*B bits per cycle from a serial input data stream IN according to a sampling clock signal CLK. The phase region decision circuit is coupled to a multiplexer which selects data of B bits from the over-sampled input data stream. The phase region decision circuit comprises a phase region comparator and a statistical circuit. The phase region comparator generates at least one set of up-down decision signals including a first up signal and a first down signal according to the over-sampled input data stream. The statistical circuit generates a set of phase-up and phase-down signals and to a phase status register which provides a current phase status signal coupled to the phase region comparator receiving the set of up-down decision signals and generating a current phase status signal to the phase region comparator for comparison and to the multiplexer for selectively outputting the over-sampled data from the sampling circuit corresponding to the current phase status signal. The multiplexer selects data of B bits from the oversampled data input signal according to the current phase status signal. The multiplexer selects the data sampled at a phase $\Phi n$. The binary up-down decision signals comprise an up signal and a down signal. The up signal has a value of 1 if a phase region of the oversampled data input signal is Rn1, wherein n1 is a modulus of nx1/k, nx1 is one of n−m+1, ... and n−m+1+ny1, and ny1 is one of 0, 1, ..., and m−1. The down signal has a value of 1 if a phase region of the oversampled data input signal is Rn2, wherein n2 is a modulus of nx2/k, nx2 is one of n+m,n+m−1, ... and n+m−ny2, and ny2 is one of 0, 1, ..., and m−1, wherein n is one of 0, 1, ..., k−1 and m is an integer of k/2. The current phase status $\Phi n5$ is indicated by the current phase status signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 7A and 7B are schematic diagrams of data processing of a post process logic circuit 370;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
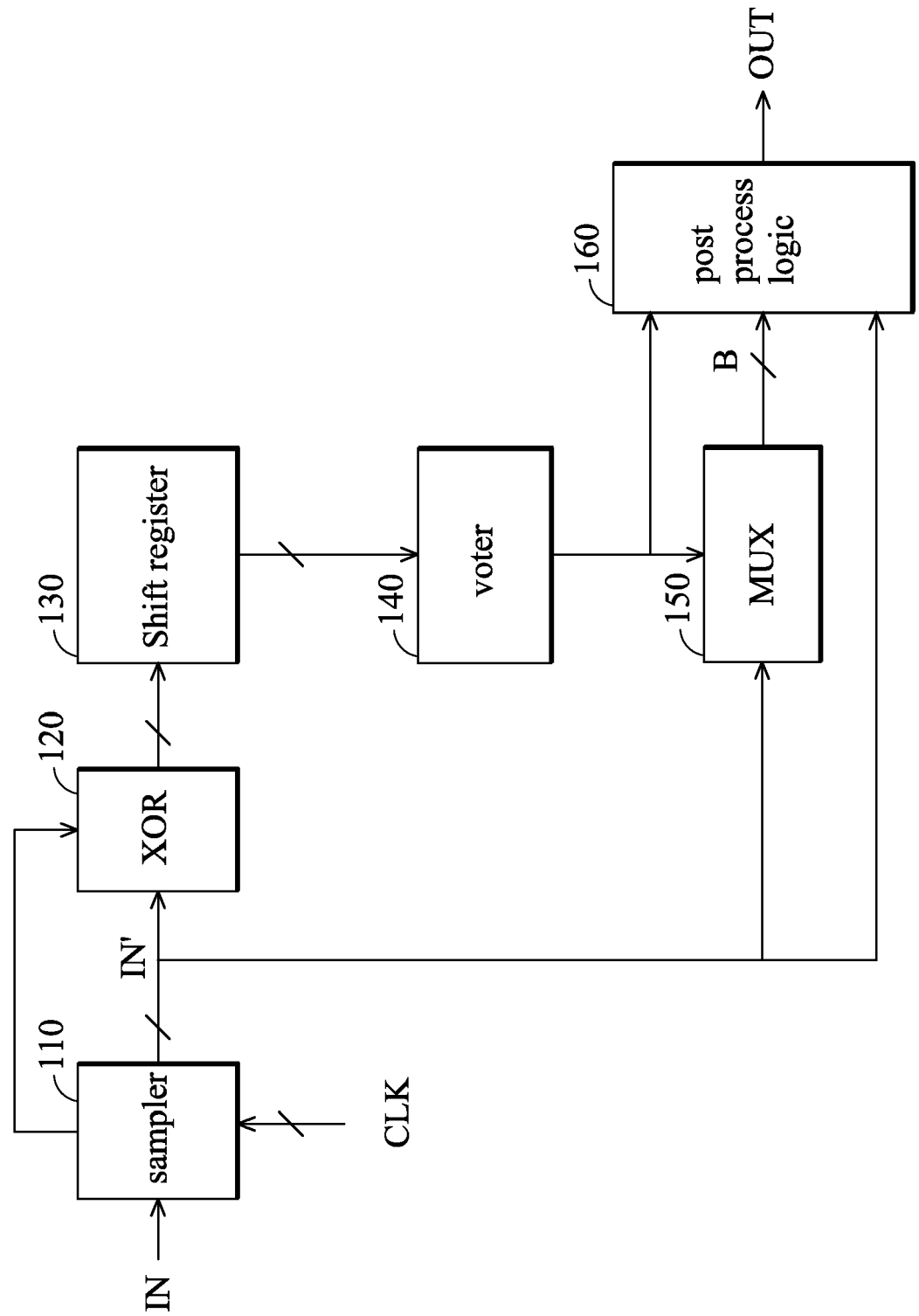
FIG. 1 shows a conventional clock data recovery circuit as disclosed in "A 0.5 um CMOS 4 Gbit/s Serial Link Transceiver with Data Recovery Using Oversampling", IEEE J. Solid-State Circuits, vol. 33, pp 713-722, May. 1998, by C. K. Yang and M. Horowitz.
Figure 2:
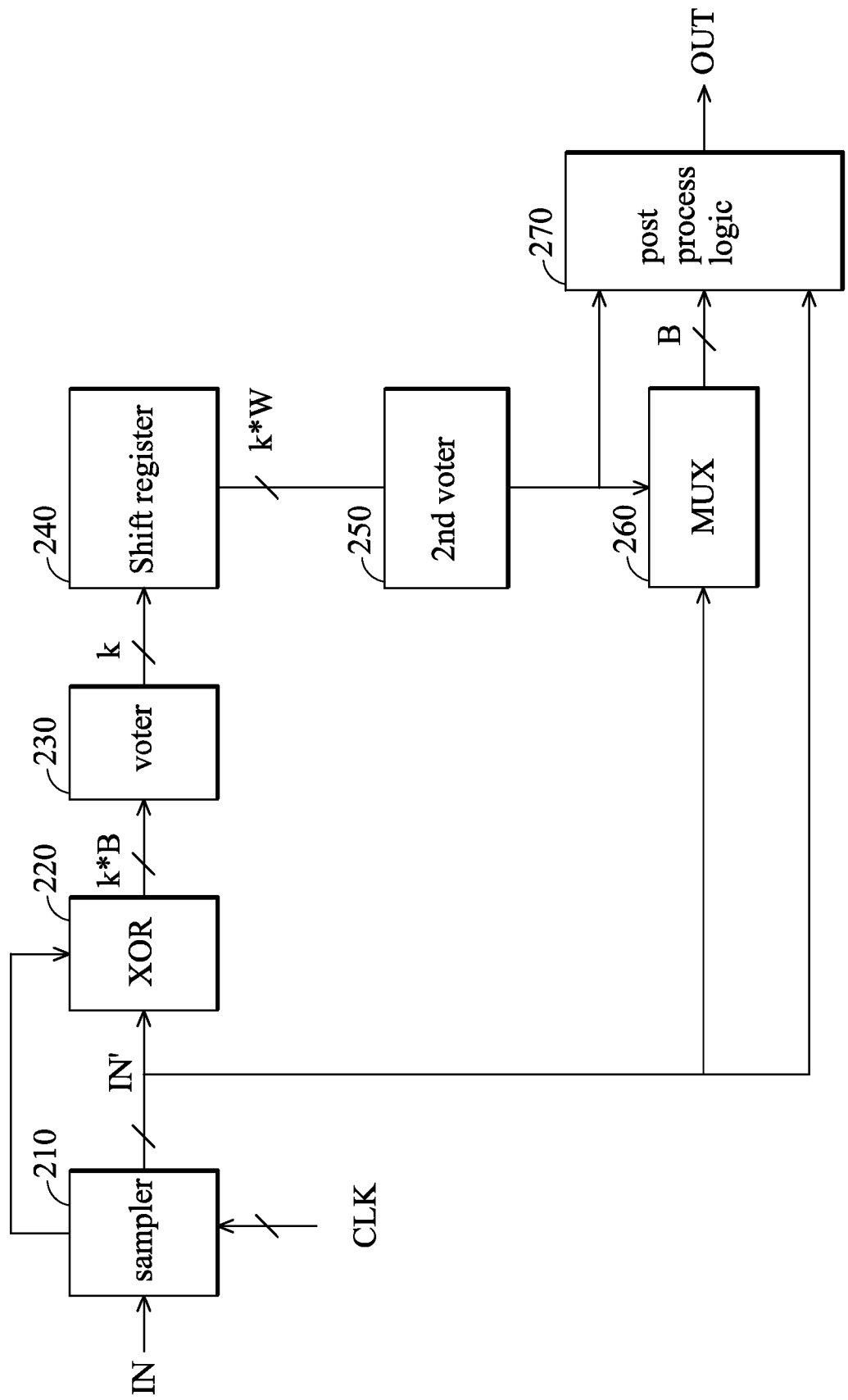
FIG. 2 shows another conventional clock data recovery circuit as disclosed in "Multi-Gigabit-Rate Clock and Data Recovery Based on Blind Oversmpling", EEE Communication Magazine, pp. 68-74, December 2003, by J. Kim and D. K. Jeong.
Figure 3A:
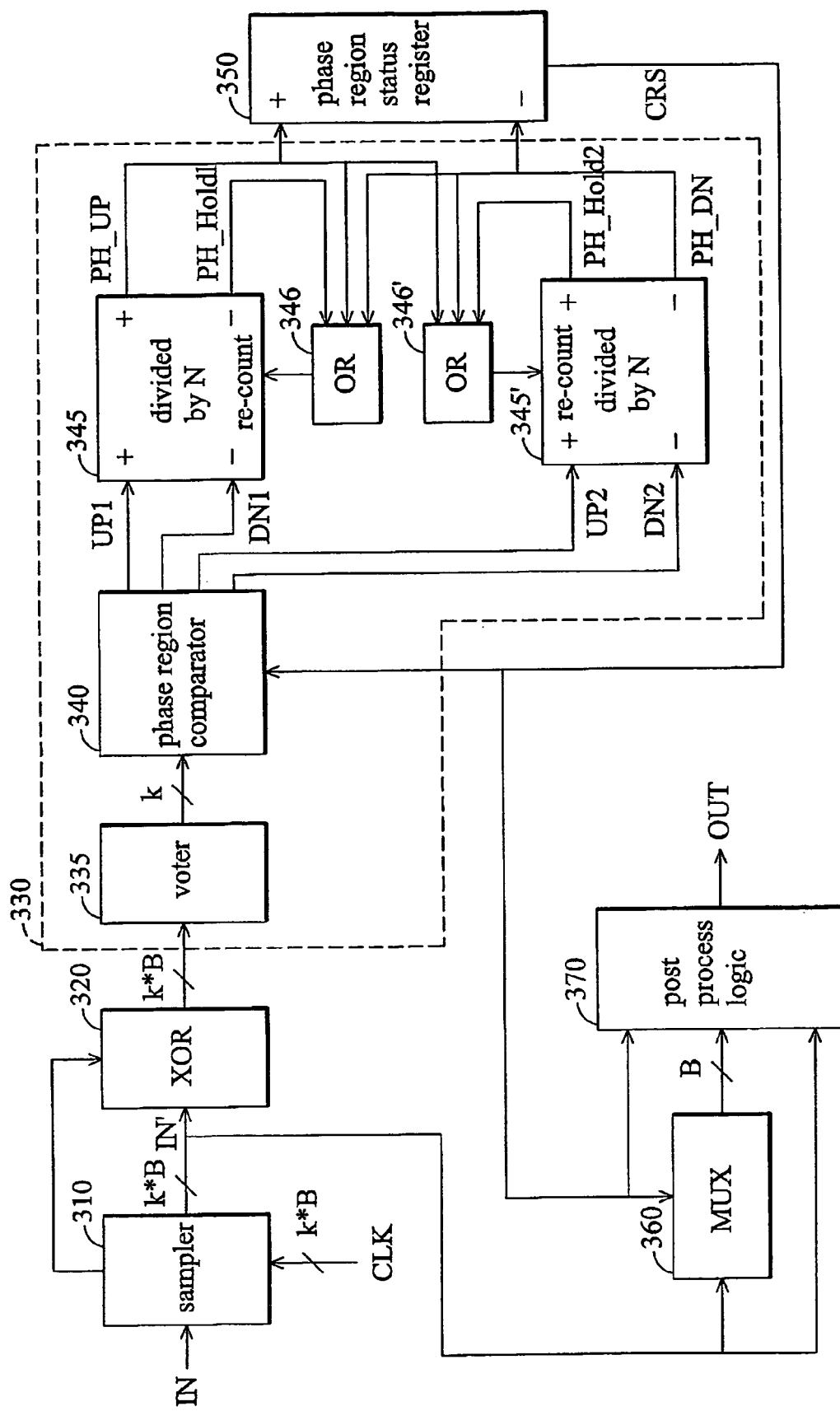
FIG. 3A shows a block diagram of a clock data recovery circuit with feedback type phase detection according to an embodiment of the invention.

FIG. 3A is a block diagram of a clock data recovery circuit with feedback type phase detection according to an embodiment of the invention. The clock data recovery circuit provides an output signal of B bits and comprises a sampler 310, an XOR circuit block 320, a phase region decision circuit 330, a phase status register 350, a multiplexer 360, and a post-process logic circuit 370. The sampler 310 receives a serial input data stream IN and a sampling clock signal CLK and generates an oversampled input data stream IN'. The XOR circuit block 320 is coupled to the sampler 310 and receives the oversampled input data stream IN'. The phase region decision circuit 330 is coupled to the XOR circuit block 320 and generates a plurality of binary up-down decision signals according to the oversampled input data stream IN' and a current phase status signal CPS. The phase region decision circuit 330 comprises a voter 335, a phase region comparator 340, and two divided by N circuits 345 and 345'. The voter 335 is coupled to the XOR circuit block 320 and generates a voting result according to the oversampled input data stream IN'. The phase region comparator 340 is coupled to the voter 335 and generates the binary up-down decision signals according to the voting result. The two divided by N circuits 345 and 345' are coupled to the phase region comparator 340. The phase status register 350 is coupled to the divided by N circuits 345 and 345' and generates the current phase status signal CPS according to the binary up-down decision signals. The multiplexer 360 is coupled to the phase status register 350, the phase region decision circuit 330 and the sampler 310. The multiplexer 360 selects data of B bits from the oversampled input data stream IN' according to the current phase status signal CPS. The post process logic circuit 370 is coupled to the sampler 310, the phase decision circuit 330 and the multiplexer 360. The post process logic circuit 370 generates the output signal OUT according to the data and the current phase status signal CPS.

Figure 4:
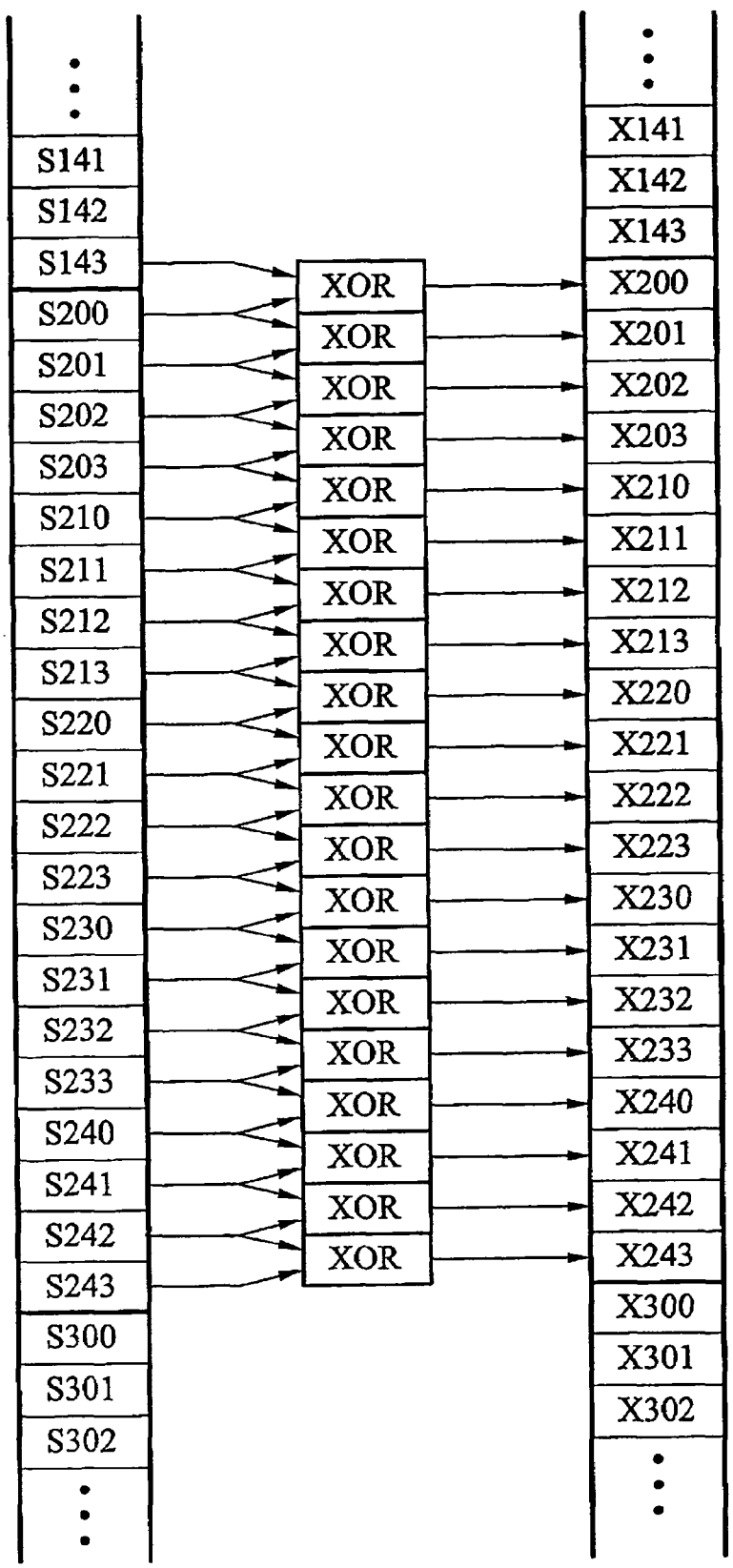
FIG. 4 is a schematic diagram illustrating function of the XOR circuit block in FIGS. 3A and 3B.
Figure 5:
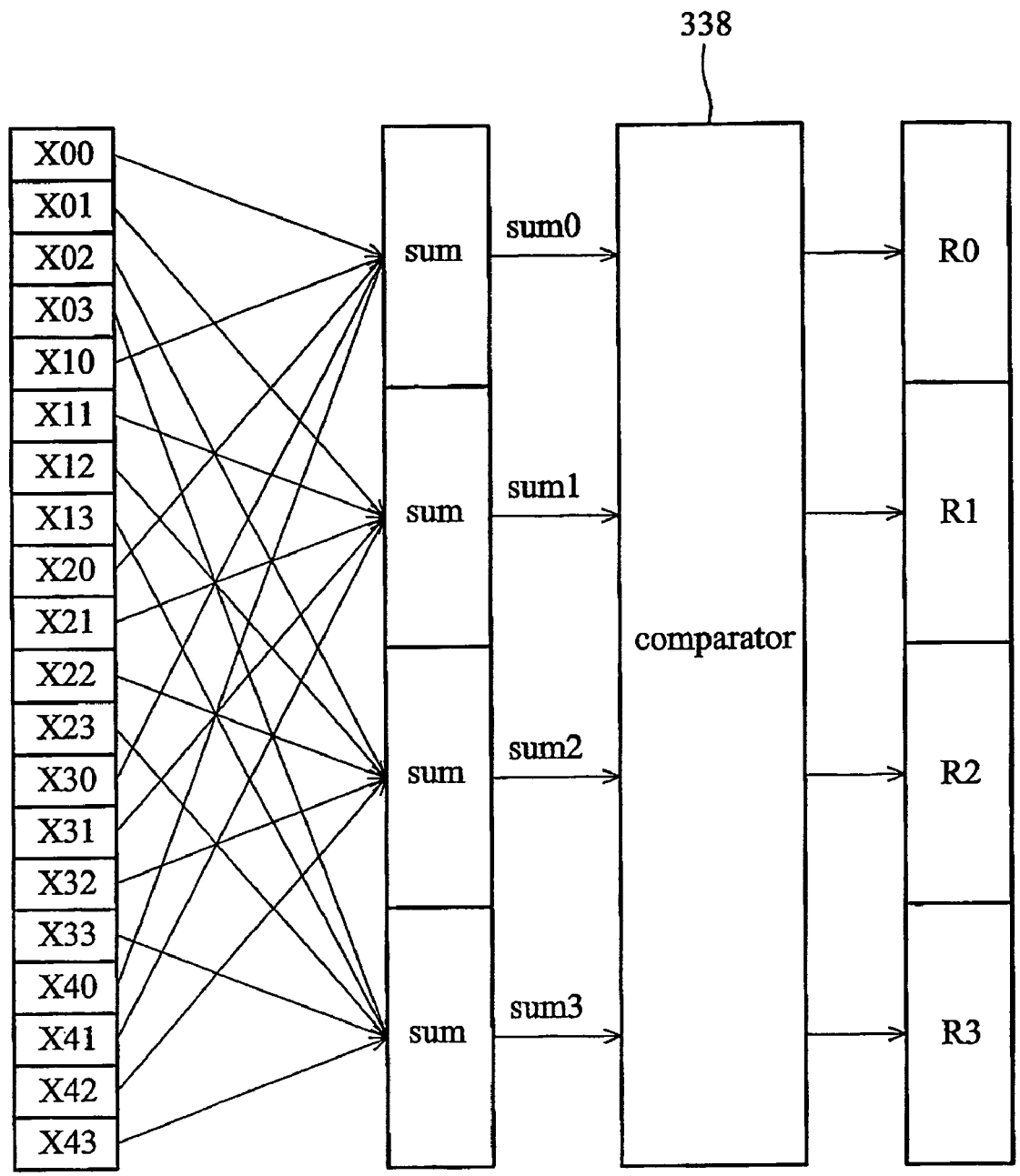
FIG. 5 is a schematic diagram showing function of the voter in FIGS. 3A and 3B.

In FIG. 3A., the serial input data stream IN is oversampled by the sampler 310. The number of bit samples in each bit period is nominally an oversampling ratio (k). The reference character B represents the number of bits sampled in a cycle. Since there are k*B sampling clocks in the sampling clock signal in a cycle, the oversampled input data stream IN' has k*B bits in a cycle. Every two consecutive data bits of the oversampled input data stream IN' are sent to an XOR logic in the XOR circuit block 320, as shown in FIG. 4. In FIG. 4, the data bits of the oversampled input data stream IN' are represented by Sxyz, wherein x is the number of the sampling cycle, y the yth bit of the input data stream IN in a sampling cycle, and z in which phase the sampling occurs. The output signal Xx'y'z' of the XOR logic equals "1" when the input data stream IN transitions between two consecutive samplings. In other words, the XOR logic detects in which phase region the input data stream IN transitions. For example, if X213 has a value of 1, the first bit in the input data stream IN transitions in the third phase region. In the voter 335, the output signal of several XOR logics, B XOR logics more specifically, corresponding to the same phase region is summed, as shown in FIG. 5. The summed number of each region is sent to a comparator 338 inside the voter 335 and the comparator 338 determines in which region data transition is most likely to occur. The voting result of the voter 335 is sent to the phase region comparator 340. The phase region comparator 340 compares the current phase status and the result of the current vote and generates binary up-down decision signals. The binary up-down decision signals comprise a first up signal UP1, a first down signal DN1, a second up signal UP2, and a second down signal DN2. The first up signal UP1 has a value of 1 if a phase region of the oversampled input data stream IN' is Rn1, wherein n1 is a modulus of nx1/k, nx1 is one of n+1,n+2, ... and n+ny1, and ny1 is one of 1, 2, ..., and m. The first down signal DN1 has a value of 1 if a phase region of the oversampled input data stream IN' is Rn2, wherein n2 is a modulus of nx2/k, nx2 is one of n,n−1, ... and n−ny2, and ny2 is one of 0, 1, ..., and m. The second up signal UP2 has a value of 1 if a phase region of the oversampled input data stream IN' is Rn3, wherein n3 is a modulus of nx3/k, nx3 is one of n,n+1, ... and n+ny3, and ny3 is one of 0, 1, ..., and m. The second down signal DN2 has a value of 1 if a phase region of the oversampled input data stream IN' is Rn4, wherein n4 is a modulus of nx4/k, nx2 is one of n−1, n−2, .... and n−ny4 , and ny4 is one of 1, 2, ..., and m, wherein n is one of 0, 1, ..., k−1 and m is an integer of (k−1)/2. In the embodiment, the current phase status $\Phi n5$ is indicated by the current phase status signal.

The first divided by N circuit 345 receives the first up signal UP1 and the first down signal DN1 and generates a phase-up signal PH_UP and a first phase-hold signal PH_hold1. The second divided by N circuit 345' receives the second up signal UP2 and the second down signal DN2 and generates a phase-down signal PH_DN and a second phase-hold signal PH_hold2. The phase status register 350 dynamically adjusts and generates a current phase status signal CPS, indicating in which phase the output signal should be, according to the phase-up, phase-down, and phase-hold signals. The current phase status signal CPS is fed back to the phase region comparator 340 such that the phase region comparator 340 stays informed of whether the current region needs to be changed. The current phase status signal CPS is an indicator of from which phase region the output data signal should be selected. As a result, the multiplexer 360 selects data of B bits from the oversampled input data stream IN' according to the current phase status signal CPS. More, specifically, the multiplexer 360 selects the data sampled in at a phase $\Phi n5$, wherein n5 is a modulus of nx5/k, and nx5 is a sum of k and m.

Figure 6:
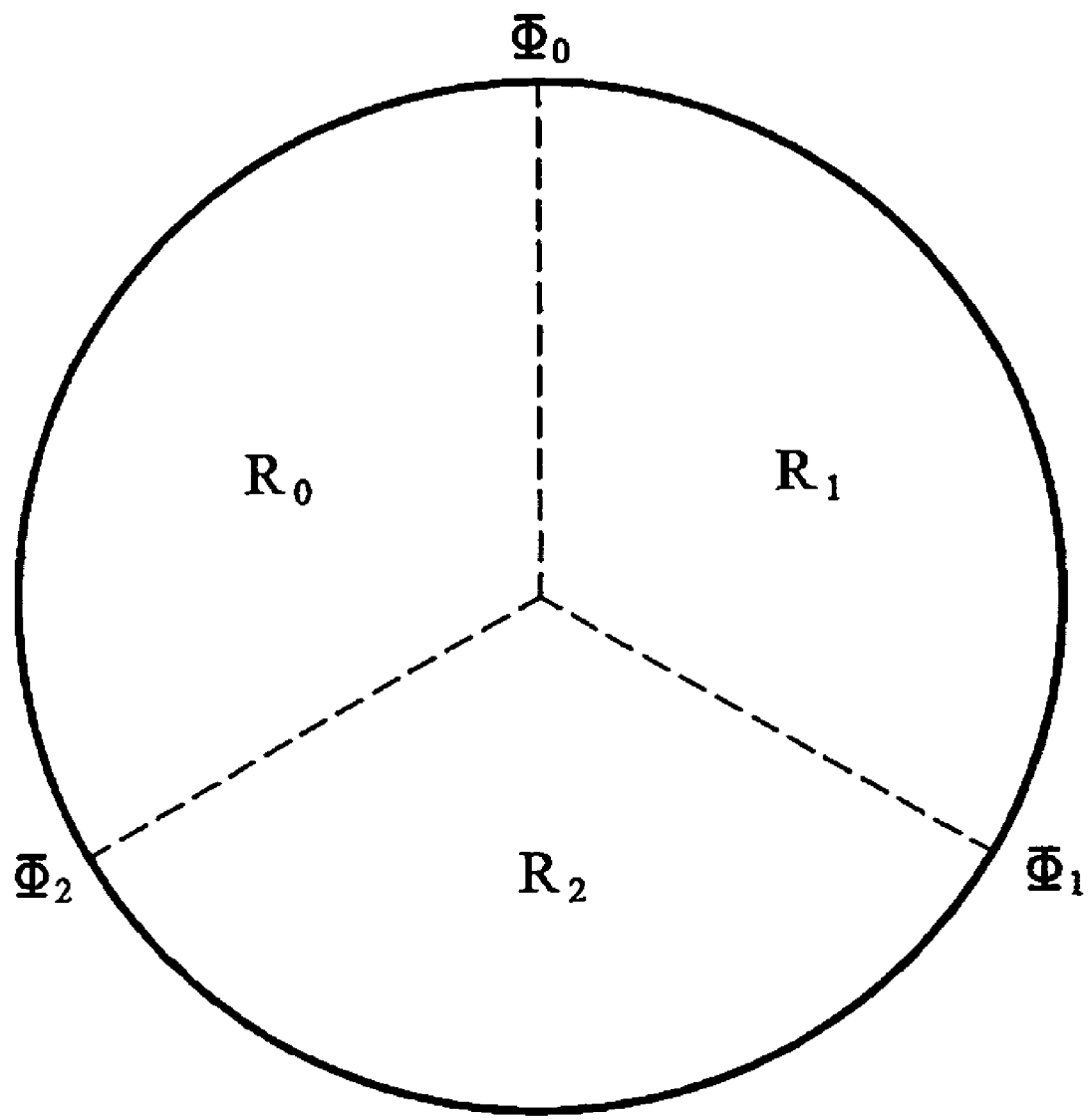
FIG. 6 is a schematic diagram illustrating an exemplary case of the clock data recovery circuit in FIGS. 3A and 3B.

With oversampling ratio K of 3 (K=3) as an example, as shown in FIG. 6, if the current phase status is $\Phi 2$, the decision rule of the phase region comparator 340 is defined as follows. The first up signal UP1 is defined, by the phase region comparator 340, as 1 when the result of the current vote is the second region (R2). The first down signal DN1 is defined as 1 when the result of the current vote is the first region (R1) or either the 0th region (R0) or the first region (R1). The second up signal UP2 is defined as 1 when the result of the current vote is the first region (R1) or either the first region (R1) or the second region (R2). The second down signal DN2 is defined as 1 when the result of the current vote is 0th region (R0). After processing of the two divided_by_N circuits 345 and 345', two OR logics 346 and 346' and the phase status register 350, a signal is fed back to the phase region comparator 340 and the multiplexer 360. Accordingly, the multiplexer 360 selects the data bits sampled at a phase $\Phi 2$. In other words, the data bits are selected in a phase which is farthest from data transition.

FIGS. 7A and 7B are schematic diagrams of data processing of a post process logic circuit 370. The post process logic circuit 370 is used for data processing when the phase region in which the data is sampled suddenly changes. If oversampling ratio equals 5 (k=5), for example. when the data is originally sampled in a phase region $\Phi 0$ and later in a phase region $\Phi 4$, an underflow event occurs, as shown in FIG. 7A. The post process logic circuit inserts an extra bit S300 into the data stream. The oversampled input data stream from S200 to S290 is sampled at a phase Φ0 and the oversampled input data stream from S300 to S394 at a phase Φ4. Conversely, when the data is originally sampled in a phase region Φ4 and later in a phase region Φ0, an overflow event occurs, as shown in FIG. 7B. The post process logic circuit drops a bit S300 (not shown in FIG. 7B) from the data stream. The oversampled input data stream from S204 to S294 is sampled at a phase Φ4 and the oversampled input data stream from S310 to S390 at a phase φ0.

Figure 3B:
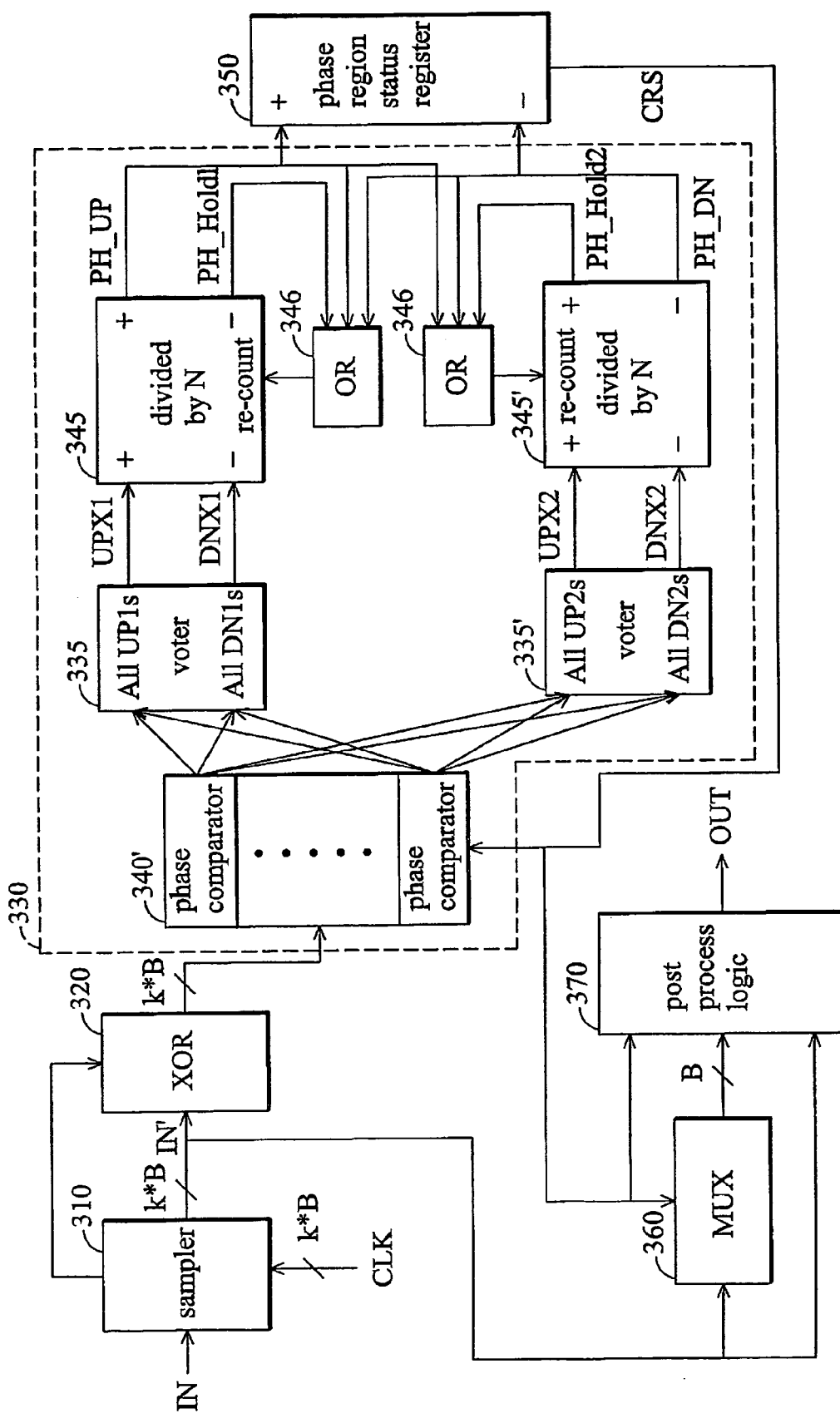
FIG. 3B shows a variation of the clock data recovery circuit in FIG. 3A.

FIG. 3B shows a variation of the clock data recovery circuit in FIG. 3A, differing in that the phase region decision circuit comprises a plurality of phase region comparators 340', first and second voters 335 and 335', and two divided by N circuits 345 and 345'. The phase region comparators 340' are coupled to the XOR circuit block 320 and respectively generate the binary up-down decision signals according to XORed results of the oversampled input data stream IN'. The binary up-down decision signals have the same content as in FIG. 3A. The first voter 335 receives the first up signals UP1 and first down signals DN1 and generates first up and down voting signals according thereto. The first up voting signal UPX1 has a value of 1 if a sum of the first up signals UP1 exceeds the first down signals DN1 and a value of 0 if the sum is the same. The first down voting signal DNX1 has a value of 1 if a sum of the first down signals DN1 exceeds the first up signals UP1 and a value of 0 if the sum is the same. The second voter 335' receives the second up signals UP2 and second down signals DN2 and generates second up and down voting signals according thereto. The second up voting signal UPX2 has a value of 1 if a sum of the second up signals UP2 exceeds the second down signals DN2 and a value of 0 if the sum is the same. The second down voting signal DNX2 has a value of 1 if a sum of the second down signals DN2 exceeds the second up signals UP2 and a value of 0 if the sum is the same. The divided by N circuits 345 and 345' are respectively coupled between the first and second voters 335 and 335' and the phase status register 350 and generate a phase-up signal, a phase-down signal, and two phase-hold signals.

Figure 8A:
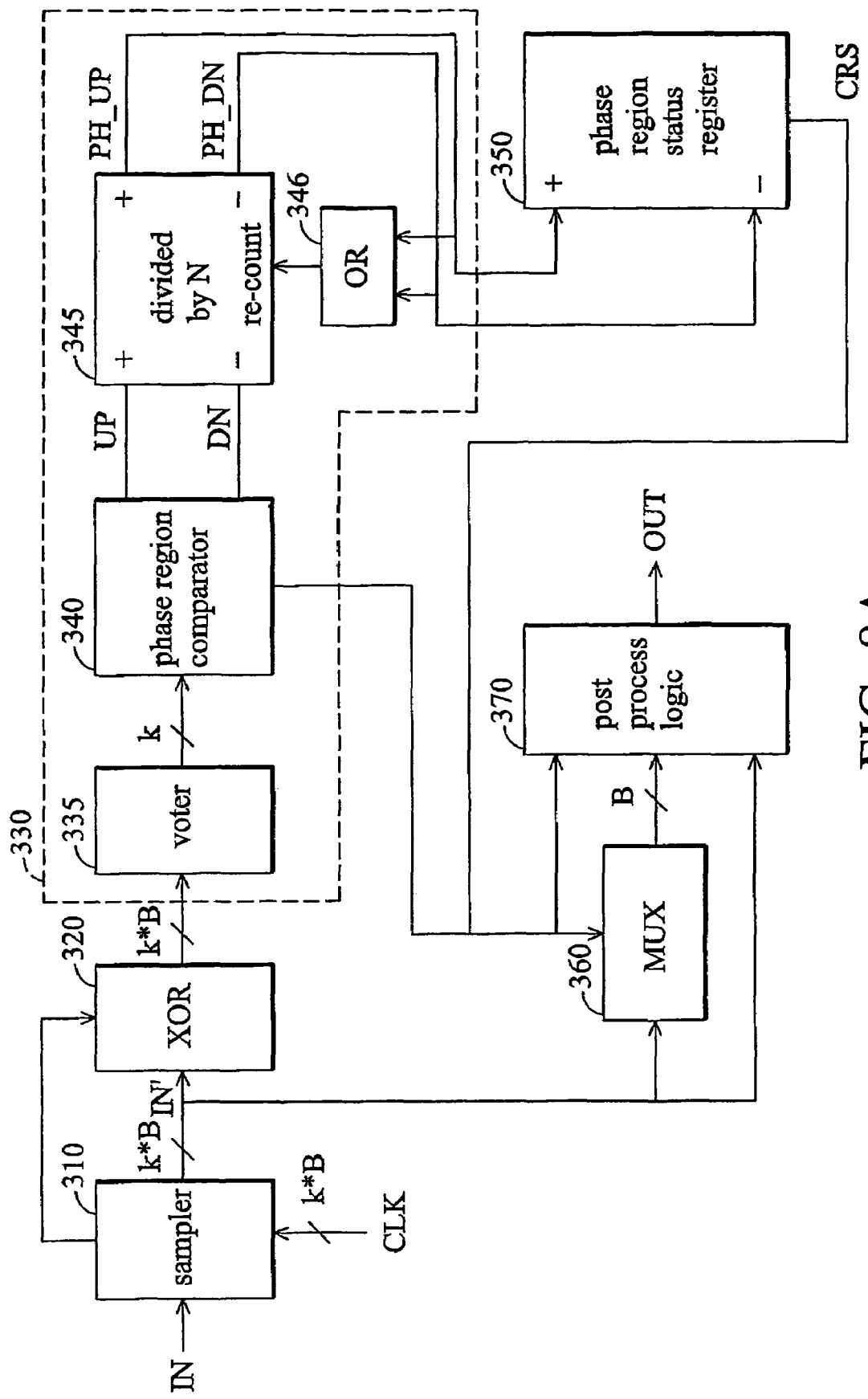
FIG. 8A shows a block diagram of a clock data recovery circuit with feedback type phase detection according to another embodiment of the invention.

FIG. 8A shows a clock data recovery circuit with feedback type phase detection according to another embodiment of the invention. The clock data recovery circuit provides an output signal of B bits and comprises a sampler 310, an XOR circuit block 320, a phase region decision circuit 330, a phase status register 350, a multiplexer 360, and a post-process logic circuit 370. The sampler 310 receives a serial input data stream IN and a sampling clock signal CLK and generates an oversampled input data stream IN'. The XOR circuit block 320 is coupled to the sampler 310 and receives the oversampled input data stream IN'. The phase region decision circuit 330 is coupled to the XOR circuit block 320 and generates a plurality of binary up-down decision signals according to the oversampled input data stream IN' and a current phase status signal CPS. The phase region decision circuit 330 comprises a voter 335, a phase region comparator 340, and a divided by N circuit 345. The voter 335 is coupled to the XOR circuit block 320 and generates a voting result according to the oversampled input data stream IN'. The phase region comparator 340 is coupled to the voter 335 and generates the binary up-down decision signals according to the voting result. The divided by N circuit 345 is coupled to the phase region comparator 340. The phase status register 350 is coupled to the divided by N circuit 330 and generates the current phase status signal CPS according to the binary up-down decision signals. The multiplexer 360 is coupled to the phase status register 350, the phase region decision circuit 330 and the sampler 310. The multiplexer 360 selects data of B bits from the oversampled input data stream IN' according to the current phase status signal CPS. The post process logic circuit 370 is coupled to the sampler 310, the phase decision circuit 330 and the multiplexer 360. The post process logic circuit 370 generates the output signal OUT according to the data and the current phase status signal CPS.

Most circuit blocks in this embodiment are the same as the first embodiment. Thus, only the phase region decision circuit 330 and the phase status register 350 are described in detail herein. In the voter 335, the output signal of several XOR logics, B XOR logics more specifically, corresponding to the same phase region is summed, as shown in FIG. 4. The summed number of each region is sent to a comparator 338 inside the voter 335 and the comparator 338 determines in which region data transition is most likely to occur. The voting result of the voter 335 is sent to the phase region comparator 340. The phase region comparator 340 compares the current phase status and the result of the current vote and generates binary up-down decision signals. The binary up-down decision signals comprise an up signal UP and a down signal DN. The up signal UP has a value of 1 if a phase region of the oversampled input data stream is Rn1, wherein n1 is a modulus of nx1/k, nx1 is one of n−m+1, . . . and n−m+1+ny1, and ny1 is one of 0, 1, . . . , and m−1. The down signal DN has a value of 1 if a phase region of the oversampled input data stream is Rn2, wherein n2 is a modulus of nx2/k, nx2 is one of n+m,n+m−1, . . . and n+m−ny2, and ny2 is one of 0, 1, . . . , and m−1, wherein n is one of 0, 1, . . . , k−1 and m is an integer of k/2. In the embodiment, a current phase status Φn is indicated by the current phase status signal CPS.

The divided by N circuit 345 receives the up signal UP and the down signal DN and generates a phase-up signal PH_UP and a phase-down signal PH_DN. The phase status register 350 dynamically adjusts and generates a current phase status signal CPS, indicating in which phase the output signal should be, according to the phase-up and phase-down signals. The current phase status signal CPS is fed back to the phase region comparator 340 such that the phase region comparator 340 stays informed of whether the current region needs to be changed. The current phase status signal CPS is an indicator of from which phase region the output data signal should be selected. As a result, the multiplexer 360 selects data of B bits from the oversampled input data stream IN' according to the current phase status signal CPS. More specifically, the multiplexer 360 selects the data sampled at a phase Φn.

Figure 9:
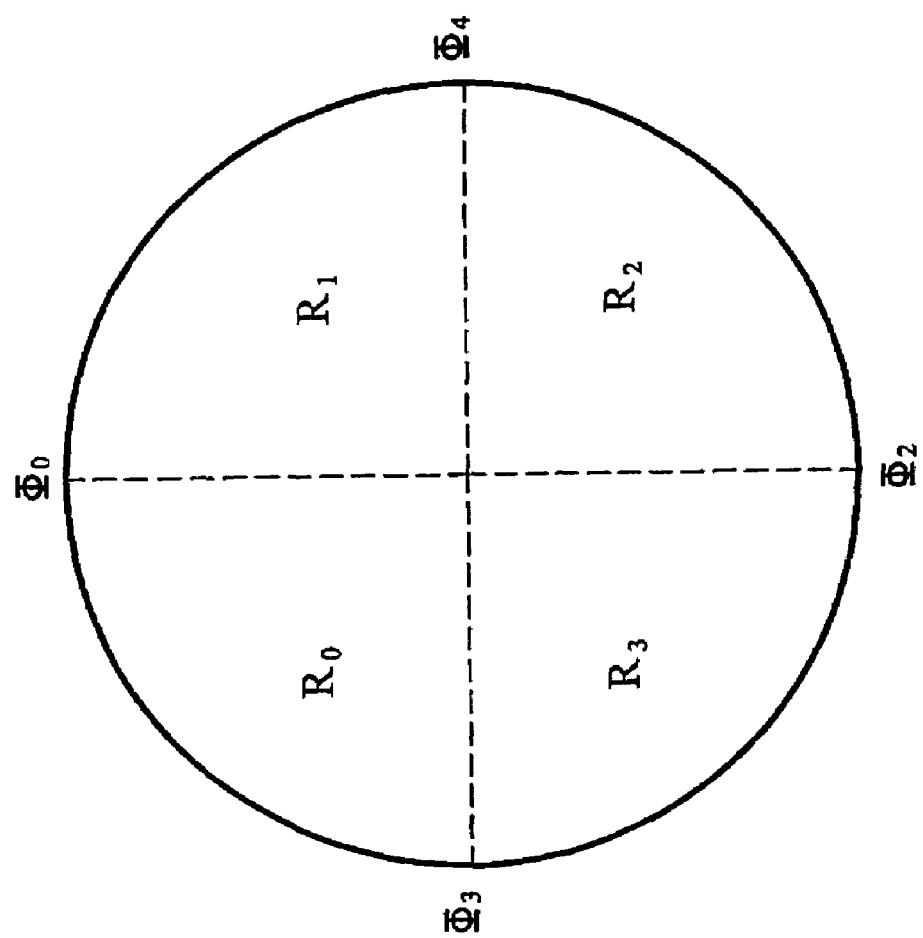
FIG. 9 is a schematic diagram illustrating an exemplary case of the clock data recovery circuit in FIGS. 3A and 3B.

If oversampling ratio K of 4 (K=4) is taken as an example, as shown in FIG. 9, if the current phase status is Φ1, the decision rule of the phase region comparator is defined as follows. The up signal UP is defined, by the phase region comparator, as 1 when the result of the current vote is the 0th region (R0), or either of the 0th region (R0) and the first region (R1). The down signal DN is defined as 1 when the result of the current vote is the third region (R3), or either of the third region (R3) and the second region (R2). After processing of the divided_by_N circuit 345, the OR logic 346 and the phase status register 350, a signal is fed back to the phase region comparator 340 and the multiplexer 360. Accordingly, the multiplexer 3606 selects the data bits which are sampled at Φ1. In other words, the data bits are selected in a phase which is farthest from data transition.

Figure 8B:
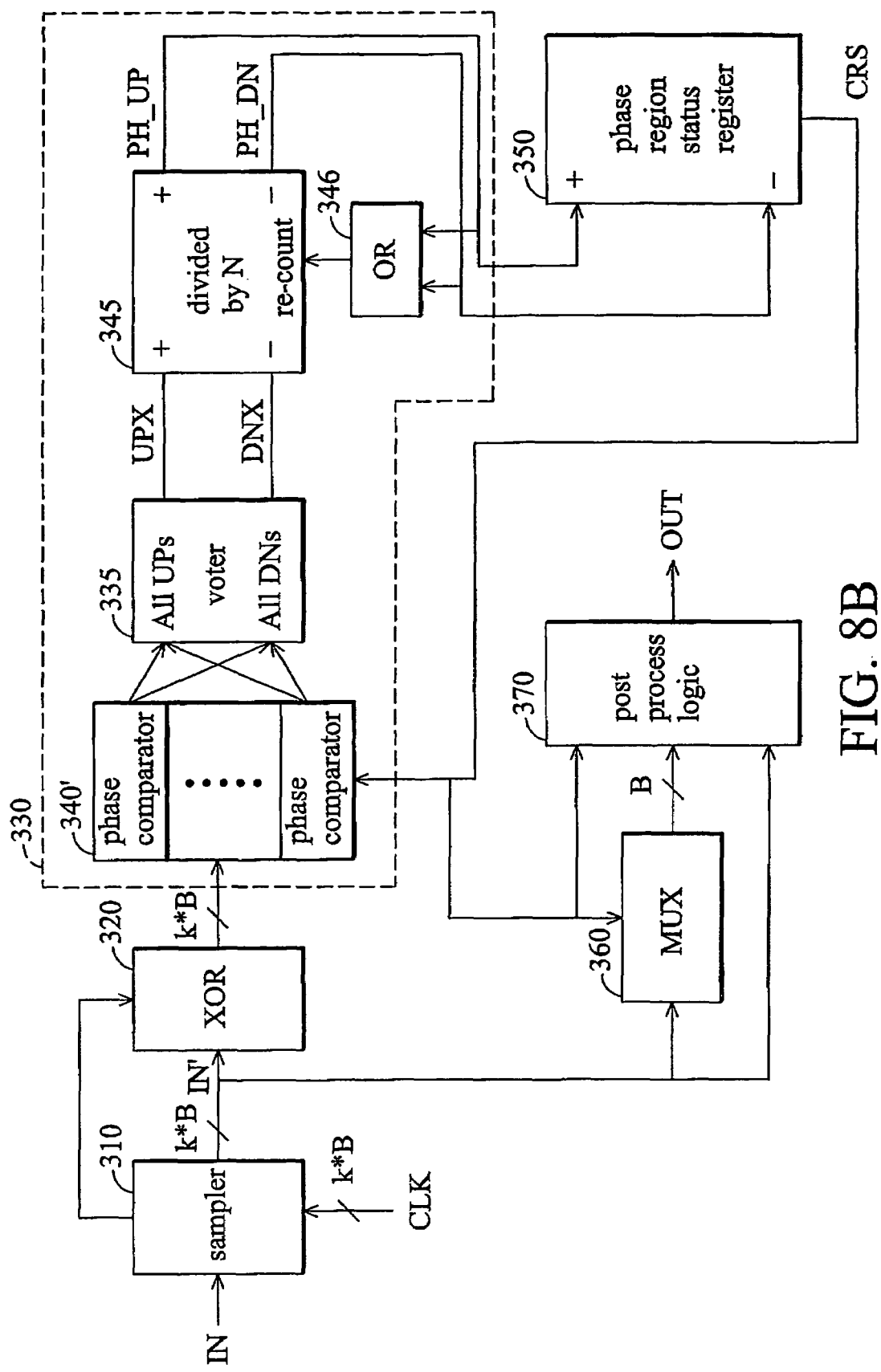
FIG. 8B shows a variation of the clock data recovery circuit in FIG. 8A.

FIG. 8B shows a variation of the clock data recovery circuit in FIG. 8A, differing in that the phase region decision circuit comprises a plurality of phase region comparators 340', a voter 335, and a divided by N circuit 345. The phase region comparators 340' are coupled to the XOR circuit block 320 and respectively generate the binary up-down decision signals according to XORed results of the oversampled input data stream IN'. The binary up-down decision signals have the same content as in FIG. 8A. The voter 335 receives the up and down signals and generates up and down voting signals according thereto. The up voting signal UPX has a value of 1 if a sum of the up signals UP exceeds the down signals DN and a value of 0 if the sum is the same. The down voting signal DNX has a value of 1 if a sum of the down signals DN exceeds the up signals UP and a value of 0 if the sum is the same. The divided by N circuit 345 is coupled between the voter 335 and the phase status register 350 and generates the phase-up and phase-down signals according to the up and down voting signals UPX and DNX.

Figure 10A:
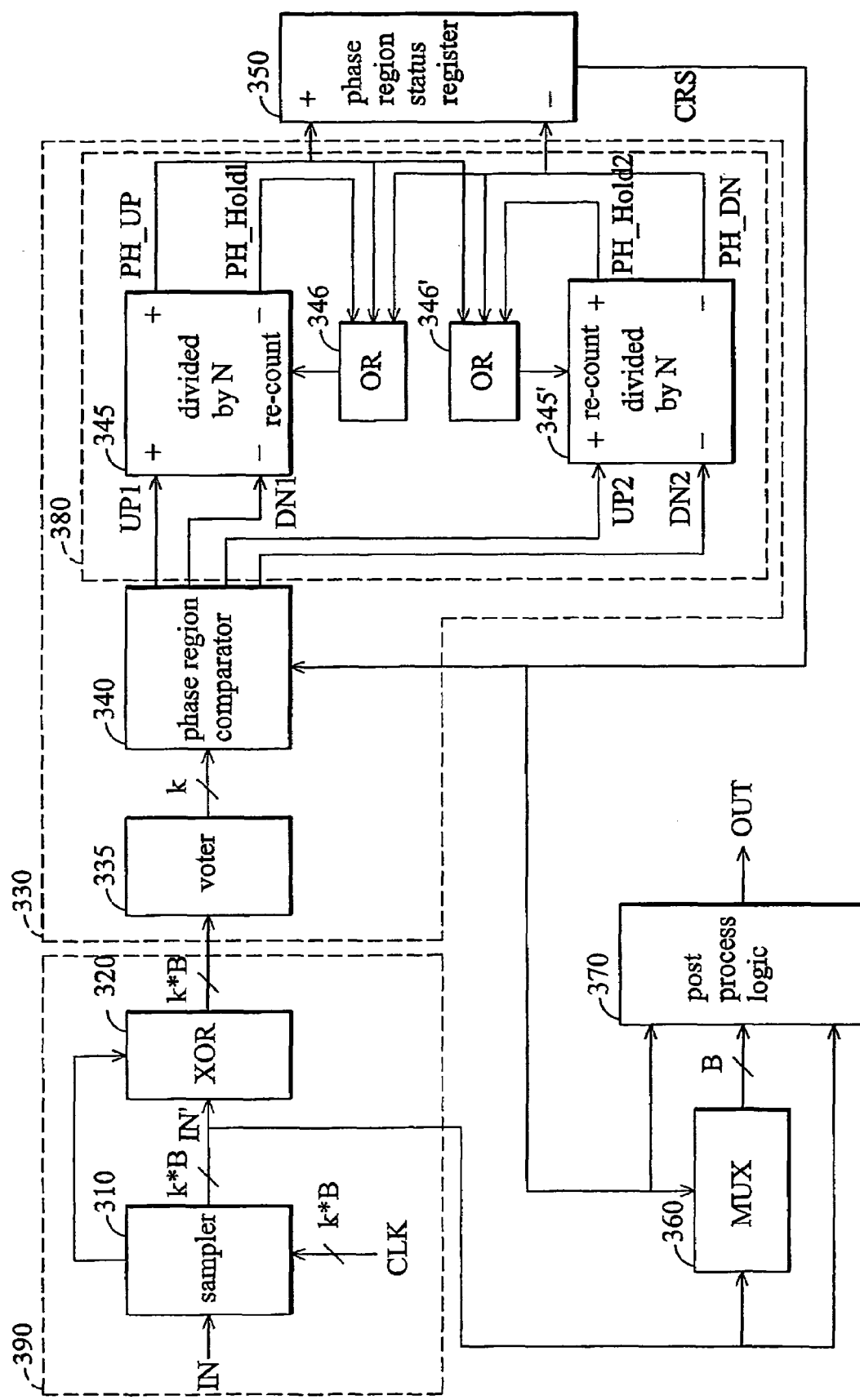
FIG. 10A shows a phase region decision circuit according to an embodiment of the invention as disclosed in FIG. 3A.

FIG. 10A is a block diagram comprising a phase region decision circuit according to an embodiment of the invention as disclosed in FIG. 3A. The phase region decision circuit 330 receives an un-voted and over-sampled input signal from a sampling circuit 390. The sampling circuit 390 includes a sampler 310 and an XOR circuit block 320 for checking data transition. The sampler 310 over-sampling k*B bits per cycle from a serial input data stream IN according to a sampling clock signal CLK. The phase region decision circuit 330 is coupled to a multiplexer 360 which selects data of B bits from the over-sampled input data stream. The phase region decision circuit 330 comprises a phase region comparator 340 and a statistical circuit 380. The phase region comparator 340 generates at least one set of up-down decision signals including a first up signal UP1, a first down signal DN1, a second up signal UP2 and a second down signal DN2 according to the over-sampled input data stream. The statistical circuit 380 generates a set of phase-up and phase-down signals PH_UP and PH_DN to a phase status register 350 which provides a current phase status signal CPS to the phase region comparator 340 receiving the set of up-down decision signals and generates a current phase status signal CPS to the phase region comparator 340 for comparison and to the multiplex for selectively outputting the over-sampled data from the sampling circuit 390 corresponding to the current phase status signal CPS. Moreover, The statistical circuit 380 comprises two divided by N circuits 345 and 345' coupled to the phase region comparator 340 and receiving the up-down decision signals and two OR circuits 346 and 346' respectively coupled to the divided by N circuits 345 and 345'. The sampler 310 receives a serial input data stream IN and a sampling clock signal CLK and generates an oversampled input data stream IN'. The XOR circuit block 320 is coupled to the sampler 310 and receives the oversampled input data stream IN'. The phase region decision circuit 330 is coupled to the XOR circuit block 320 and generates a plurality of binary up-down decision signals according to the oversampled input data stream IN' and a current phase status signal CPS. The voter 335 is coupled to the XOR circuit block 320 and generates a voting result according to the oversampled input data stream IN'. The phase region comparator 340 is coupled to the voter 335 and generates the binary up-down decision signals according to the voting result. The two divided by N circuits 345 and 345' are coupled to the phase region comparator 340. The phase status register 350 is coupled to the divided by N circuits 345 and 345' and generates the current phase status signal CPS according to the binary up-down decision signals. The multiplexer 360 is coupled to the phase status register 350, the phase region decision circuit 330 and the sampler 310. The multiplexer 360 selects data of B bits from the oversampled input data stream IN' according to the current phase status signal CPS. The post process logic circuit 370 is coupled to the sampler 310, the phase decision circuit 330 and the multiplexer 360. The post process logic circuit 370 generates the output signal OUT according to the data and the current phase status signal CPS.

Figure 10B:
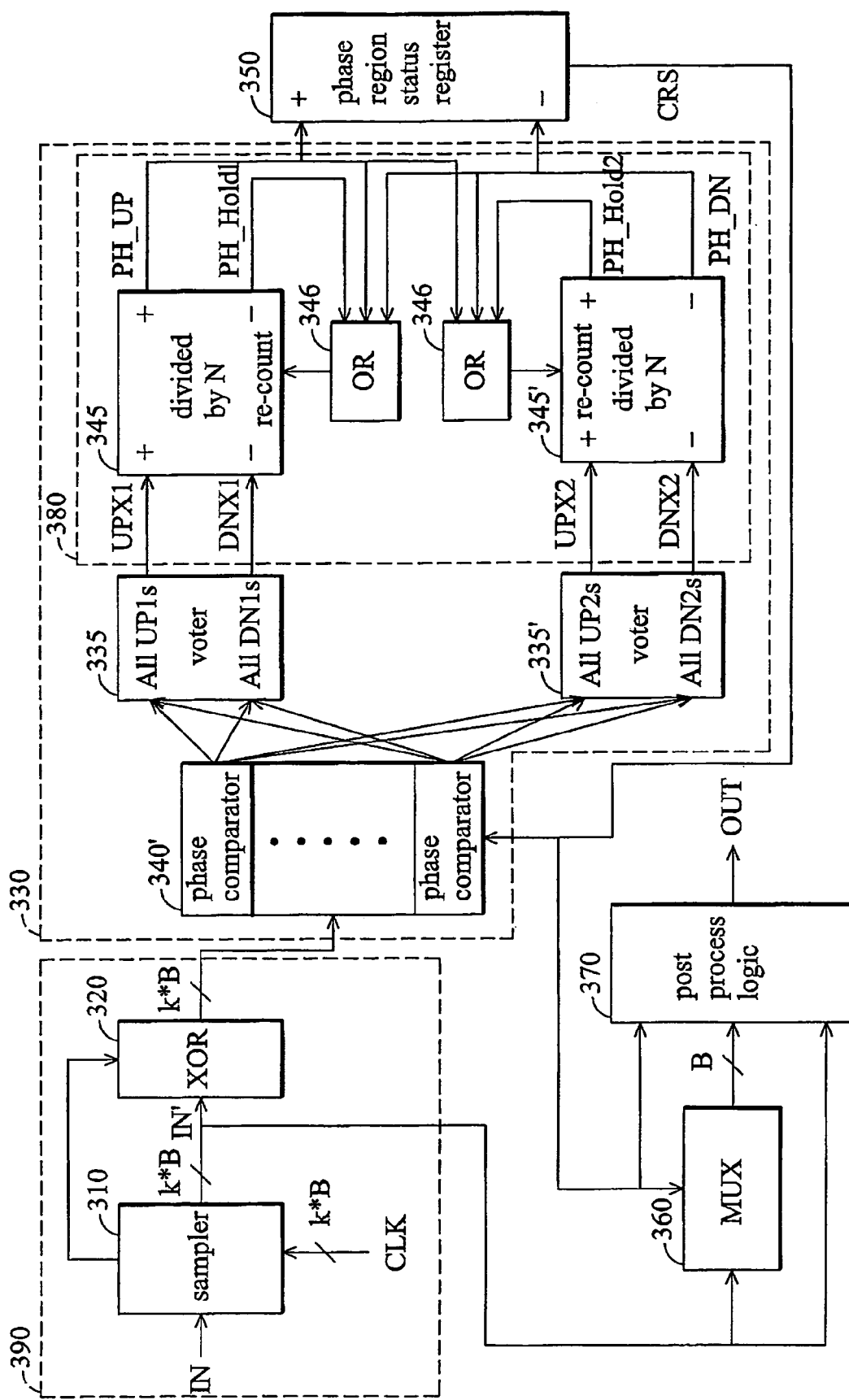
FIG. 10B shows a variation of the phase region decision circuit in FIG. 10A according to the embodiment as disclosed in FIG. 3B.

FIG. 10B shows a variation of the phase region decision circuit in FIG. 10A according to the embodiment as disclosed in FIG. 3B, differing in that the phase region decision circuit comprises a plurality of phase region comparators 340', first and second voters 335 and 335', and two divided by N circuits 345 and 345'. The phase region comparators 340' are coupled to the XOR circuit block 320 and respectively generate the binary up-down decision signals according to XORed results of the oversampled input data stream IN'. The binary up-down decision signals have the same content as in FIG. 10A. The first voter 335 receives the first up signals UP1 and first down signals DN1 and generates first up and down voting signals according thereto. The first up voting signal UPX1 has a value of 1 if a sum of the first up signals UP1 exceeds the first down signals DN1 and a value of 0 if the sum is the same. The first down voting signal DNX1 has a value of 1 if a sum of the first down signals DN1 exceeds the first up signals UP1 and a value of 0 if the sum is the same. The second voter 335' receives the second up signals UP2 and second down signals DN2 and generates second up and down voting signals according thereto. The second up voting signal UPX2 has a value of 1 if a sum of the second up signals UP2 exceeds the second down signals DN2 and a value of 0 if the sum is the same. The second down voting signal DNX2 has a value of 1 if a sum of the second down signals DN2 exceeds the second up signals UP2 and a value of 0 if the sum is the same. The divided by N circuits 345 and 345' are respectively coupled between the first and second voters 335 and 335' and the phase status register 350 and generate a phase-up signal, a phase-down signal, and two phase-hold signals.

Figure 11A:
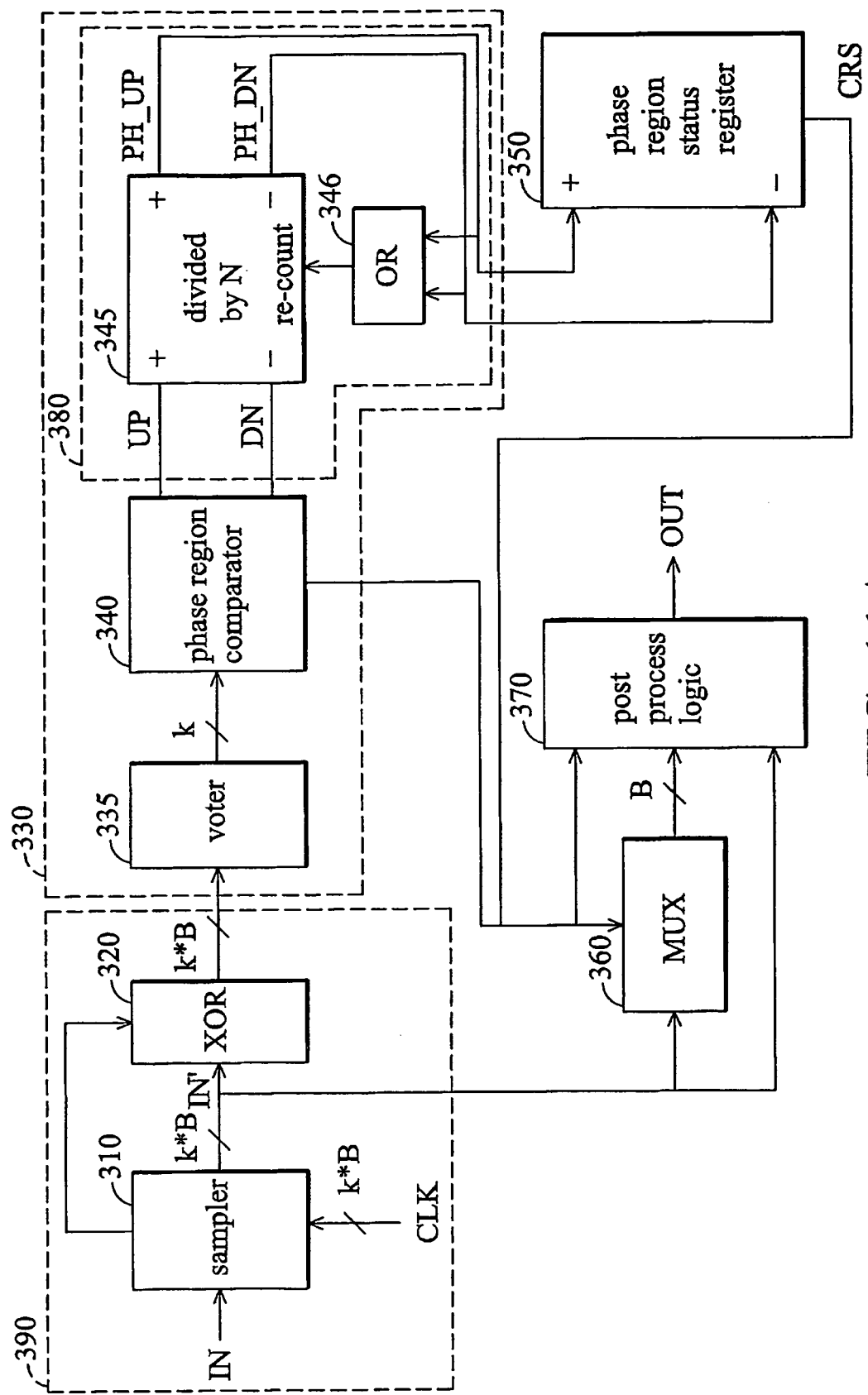
FIG. 11A shows a phase region decision circuit according to an embodiment of the invention as disclosed in FIG. 8A.

FIG. 11A shows a phase region decision circuit according to an embodiment of the invention as disclosed in FIG. 8A. The phase region decision circuit 330 receives an un-voted and over-sampled input signal from a sampling circuit 390. The sampling circuit 390 includes a sampler 310 and an XOR circuit block 320 for checking data transition. The sampler 310 over-sampling k*B bits per cycle from a serial input data stream IN according to a sampling clock signal CLK. The phase region decision circuit 330 is coupled to a multiplexer 360 which selects data of B bits from the over-sampled input data stream. The phase region decision circuit 330 comprises a phase region comparator 340 and a statistical circuit 380. The phase region comparator 340 generates at least one set of up-down decision signals including a first up signal UP1 and a first down signal DN1 according to the over-sampled input data stream. The statistical circuit 380 generates a set of phase-up and phase-down signals PH_UP and PH_DN to a phase status register 350 which provides a current phase status signal CPS coupled to the phase region comparator 340 receiving the set of up-down decision signals and generating a current phase status signal CPS to the phase region comparator 340 for comparison and to the multiplexer for selectively outputting the over-sampled data from the sampling circuit 390 corresponding to the current phase status signal CPS. Moreover, The statistical circuit 380 comprises two divided by N circuits 345 and 345' coupled to the phase region comparator 340 and receiving the up-down decision signals and two OR circuits 346 and 346' respectively coupled to the divided by N circuits 345 and 345'. The sampler 310 receives a serial input data stream IN and a sampling clock signal CLK and generates an oversampled input data stream IN'. The XOR circuit block 320 is coupled to the sampler 310 and receives the oversampled input data stream IN'. The phase region decision circuit 330 is coupled to the XOR circuit block 320 and generates a plurality of binary up-down decision signals according to the oversampled input data stream IN' and a current phase status signal CPS. The phase region decision circuit 330 comprises a voter 335, a phase region comparator 340, and a divided by N circuit 345. The voter 335 is coupled to the XOR circuit block 320 and generates a voting result according to the oversampled input data stream IN'. The phase region comparator 340 is coupled to the voter 335 and generates the binary up-down decision signals according to the voting result. The divided by N circuit 345 is coupled to the phase region comparator 340. The phase status register 350 is coupled to the divided by N circuit 330 and generates the current phase status signal CPS according to the binary up-down decision signals. The multiplexer 360 is coupled to the phase status register 350, the phase region decision circuit 330 and the sampler 310. The multiplexer 360 selects data of B bits from the oversampled input data stream IN' according to the current phase status signal CPS. The post process logic circuit 370 is coupled to the sampler 310, the phase decision circuit 330 and the multiplexer 360. The post process logic circuit 370 generates the output signal OUT according to the data and the current phase status signal CPS.

Figure 11B:
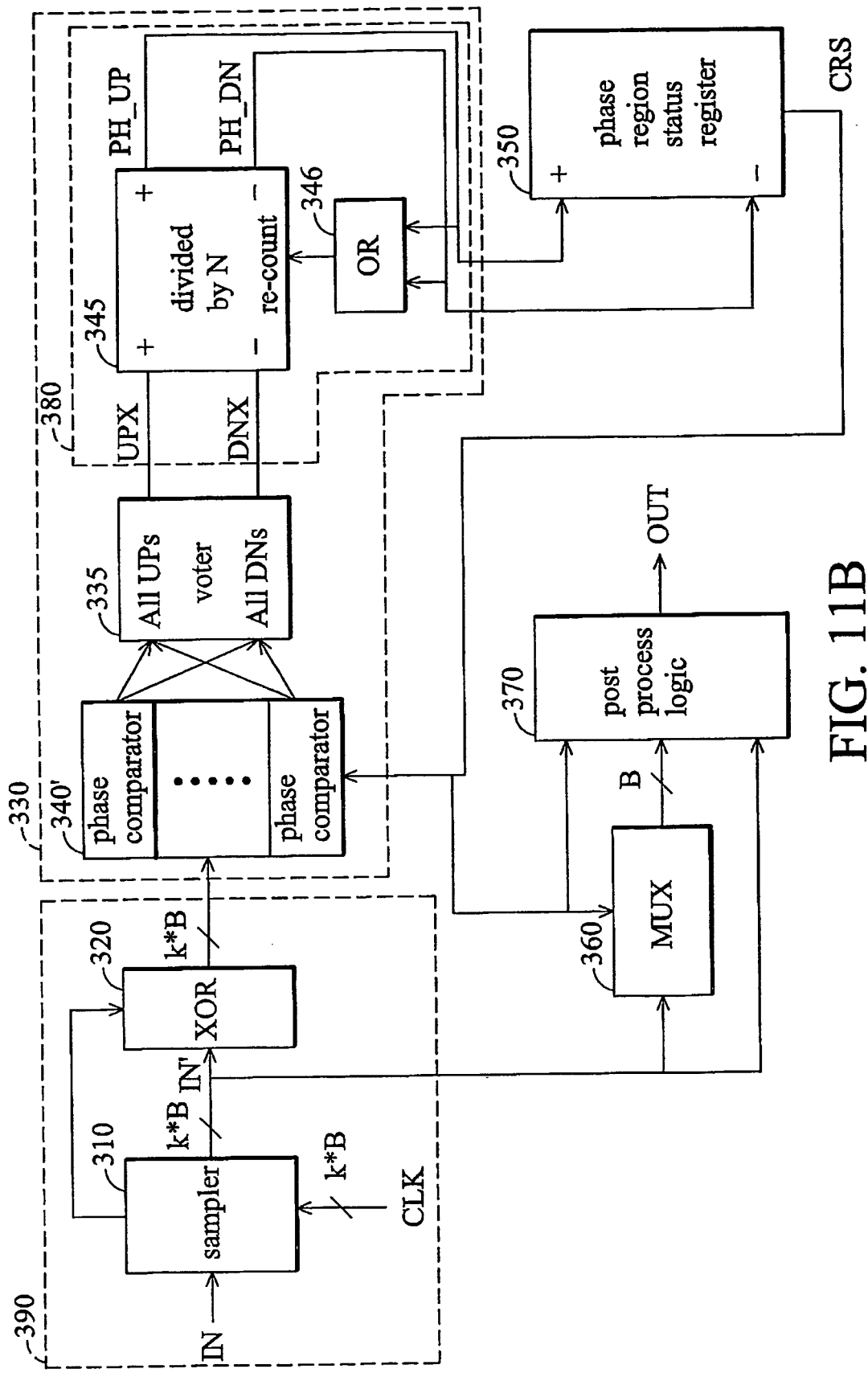
FIG. 11B shows a variation of the phase region decision circuit in FIG. 11A according to the embodiment as disclosed in FIG. 8B.

FIG. 11B shows a variation of the phase region decision circuit in FIG. 11A according to the embodiment as disclosed in FIG. 8B, differing in that the phase region decision circuit comprises a plurality of phase region comparators 340', first and second voters 335 and 335', and two divided by N circuits 345 and 345'. The phase region comparators 340' are coupled to the XOR circuit block 320 and respectively generate the binary up-down decision signals according to XORed results of the oversampled input data stream IN'. The binary up-down decision signals have the same content as in FIG. 3A. The first voter 335 receives the first up signals UP1 and first down signals DN1 and generates first up and down voting signals according thereto. The first up voting signal UPX1 has a value of 1 if a sum of the first up signals UP1 exceeds the first down signals DN1 and a value of 0 if the sum is the same. The first down voting signal DNX1 has a value of 1 if a sum of the first down signals DN1 exceeds the first up signals UP1 and a value of 0 if the sum is the same. The second voter 335' receives the second up signals UP2 and second down signals DN2 and generates second up and down voting signals according thereto. The second up voting signal UPX2 has a value of 1 if a sum of the second up signals UP2 exceeds the second down signals DN2 and a value of 0 if the sum is the same. The second down voting signal DNX2 has a value of 1 if a sum of the second down signals DN2 exceeds the second up signals UP2 and a value of 0 if the sum is the same. The divided by N circuits 345 and 345' are respectively coupled between the first and second voters 335 and 335' and the phase status register 350 and generate a phase-up signal, a phase-down signal, and two phase-hold signals.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clock data recovery circuit with feedback type phase decision, providing an output signal of B bits, comprising:
    a sampler, oversampling k*B bits per cycle from a serial input data stream according to a sampling clock signal;
    a phase region decision circuit, internally generating a plurality of binary up-down decision signals according to the oversampled serial input data stream and a current phase status signal;
    a phase status register, generating the current phase status signal according to the binary up-down decision signals; and
    a multiplexer, selecting data of B bits from the oversampled serial input data stream according to the current phase status signal;
    wherein the multiplexer selects the data sampled in at a phase $\Phi n5$, wherein n5 is a modulus of nx5/k, and nx5 is a sum of k and m, and the plurality of binary up-down decision signals comprise:
        a first up signal, having a value of 1 if a phase region of the oversampled serial input data stream is Rn1, wherein n1 is a modulus of nx1/k, nx1 is one of n+1, n+2, ... and n+ny1, and ny1 is one of 1, 2, ..., and m;
        a first down signal, having a value of 1 if a phase region of the oversampled serial input data stream is Rn2, wherein n2 is a modulus of nx2/k, nx2 is one of n, n−1, ... and n−ny2, and ny2 is one of 0, 1, ..., and m;
        a second up signal, having a value of 1 if a phase region of the oversampled serial input data stream is Rn3, wherein n3 is a modulus of nx3/k, nx3 is one of n, n+1, ... and n+ny3, and ny3 is one of 0, 1, ..., and m; and
        a second down signal, having a value of 1 if a phase region of the oversampled serial input data stream is Rn4, wherein n4 is a modulus of nx4/k, nx4 is one of n−1, n−2, ... and n−ny4, and ny4 is one of 1, 2, ..., and m;
    wherein a current region Rn is indicated by the current phase status signal and data transition of the serial input data stream occurs between $\Phi n-1$ and $\Phi n$, wherein n is one of 0, 1, ..., k−1 and m is an integer of (k−1)/2.

2. The clock data recovery circuit as claimed in claim 1, wherein the phase region decision circuit comprises a voter generating a voting result according to the oversampled serial input data stream, a phase region comparator generating the binary up-down decision signals according to the voting result, and two divided by N circuits respectively coupled between the phase region comparator and the phase status register.

3. The clock data recovery circuit as claimed in claim 1, wherein the phase region decision circuit comprises a plurality of phase region comparators generating the binary up-down decision signals according to the oversampled serial input data stream, first and second voters respectively generating a voting result according to the binary up-down decision signals, and two divided by N circuits respectively coupled between the first and second voters and the phase status register, wherein the voting result of the first voter comprises:
    a first up voting signal, having a value of 1 if a sum of the first up signals exceeds the first down signals and a value of 0 if the sum is the same;
    a first down voting signal, having a value of 1 if a sum of the first down signals exceeds the first up signals and a value of 0 if the sum is the same; and
    the voting result of the second voter comprises:
    a second up voting signal, having a value of 1 if a sum of the second up signals exceeds the second down signals and a value of 0 if the sum is the same;
    a second down voting signal, having a value of 1 if a sum of the second down signals exceeds the second up signals and a value of 0 if the sum is the same.

4. The clock data recovery circuit as claimed in claim 1, further comprising an XOR circuit block coupled between the sampler and the phase region decision circuit.

5. The clock data recovery circuit as claimed in claim 1, further comprising a post process logic circuit generating the output signal according to the data and the current phase status signal.

6. A clock data recovery circuit with feedback type phase decision, providing an output signal of B bits, comprising:
   a sampler, oversampling k*B bits per cycle from a serial input data stream according to a sampling clock signal;
   a phase region decision circuit, generating a plurality of binary up-down decision signals according to the over-sampled serial input data stream and a current phase status signal;
   a phase status register, generating the current phase status signal according to the plurality of binary up-down decision signals; and
   a multiplexer, selecting data of B bits from the oversampled serial input data stream according to the current phase status signal;
   wherein the multiplexer selects the data sampled at a phase $\Phi n$ and the plurality of binary up-down decision signals comprise:
      an up signal, having a value of 1 if a phase region of the oversampled serial input data stream is Rn1, wherein n1 is a modulus of nx1/k, nx1 is one of n−m+1, ... and n−m+1+ny1, and ny1 is one of 0, 1, ..., and m−1; and
      a down signal, having a value of 1 if a phase region of the oversampled serial input data stream is Rn2, wherein n2 is a modulus of nx2/k, nx2 is one of n+m,n+m−1, ... and n+m−ny2, and ny2 is one of 0, 1, ..., and m−1;
   wherein a current region Rn is indicated by the current phase status signal and data transition of the serial input data stream occurs between $\Phi n-1$ and $\Phi n$, n is one of 0, 1, ..., k−1 and m is an integer of (k−1)/2.

7. The clock data recovery circuit as claimed in claim 6, wherein the phase region decision circuit comprises a voter generating a voting result according to the oversampled serial input data stream, a phase region comparator generating the plurality of binary up-down decision signals according to the voting result, and a divided by N circuits respectively coupled between the phase region comparator and the phase status register.

8. The clock data recovery circuit as claimed in claim 6, wherein the phase region decision circuit comprises a plurality of phase region comparators generating the binary up-down decision signals according to the oversampled serial input data stream, a voter generating a voting result according to the plurality of binary up-down decision signals, and a divided by N circuit coupled between the phase region comparator and the phase status register, wherein the voting result of the voter comprises:
   a up voting signal, having a value of 1 if a sum of the up signals exceeds the down signals and a value of 0 if the sum is the same;
   a down voting signal, having a value of 1 if a sum of the down signals exceeds the up signals and a value of 0 if the sum is the same.

9. The clock data recovery circuit as claimed in claim 6, further comprising an XOR circuit block coupled between the sampler and the phase region decision circuit.

10. The clock data recovery circuit as claimed in claim 6, further comprising a post process logic circuit generating the output signal according to the data and the current phase status signal.

11. A phase region decision circuit for receiving an unvoted and over-sampled input data from a sampling circuit; the sampling circuit including a sampler and an XOR for checking data transition, the sampler over-sampling k*B bits per cycle from a serial input data stream according to a sampling clock signal, the phase region decision circuit coupled to a multiplexer, selecting data of B bits from the over-sampled input data, and comprising:
   a phase region comparator for generating at least one set of up-down decision signals including a first up signal, a first down signal, a second up signal and a second down signal according to the over-sampled input data;
   a statistical circuit generating a set of phase-up and phase-down signals to a phase status register which provides a current phase status signal to the phase region comparator receiving the set of up-down decision signals and generating a current phase status signal to the phase region comparator for comparison and to the multiplexer for selectively outputting the over-sampled data from the sampling circuit corresponding to the current phase status signal
   wherein the multiplexer selects the data sampled in at a phase $\Phi n5$, wherein n5 is a modulus of nx5/k, and nx5 is a sum of k and m, and the set of up-down decision signals comprise:
      a first up signal, having a value of 1 if a phase region of the oversampled input data is Rn1, wherein n1 is a modulus of nx1/k, nx1 is one of n+1,n+2, ... and n+ny1, and ny1 is one of 1, 2, ..., and m;
      a first down signal, having a value of 1 if a phase region of the oversampled input data is Rn2, wherein n2 is a modulus of nx2/k, nx2 is one of n,n−1, ... and n−ny2, and ny2 is one of 0, 1, ..., and m;
      a second up signal, having a value of 1 if a phase region of the oversampled input data is Rn3, wherein n3 is a modulus of nx3/k, nx3 is one of n,n+1, ... and n+ny3, and ny3 is one of 0, 1, ..., and m; and
      a second down signal, having a value of 1 if a phase region of the oversampled input data is Rn4, wherein n4 is a modulus of nx4/k, nx4 is one of n−1, n−2, ... and n−ny4, and ny4 is one of 1, 2, ... and m;
   wherein a current region Rn is indicated by the current phase status signal and data transition of the serial input data stream occurs between $\Phi n-1$ and $\Phi n$, wherein n is one of 0, 1, ..., k−1 and m is an integer of (k−1)/2.

12. The phase region decision circuit as claimed in claim 11, the statistical circuit further comprising two divided by N circuits coupled to the phase region comparator and receiving the up-down decision signals and two OR circuits respectively coupled to the divided by N circuits.

13. The phase region decision circuit as claimed in claim 11, the phase region decision circuit further comprising a voter coupled between the sampling circuit and the phase region comparator to generate a voting result according to the over-sampled input data, the phase region comparator generating the up-down decision signals according to the voting result.

14. The phase region decision circuit as claimed in claim 13, the statistical circuit further comprising two divided by N circuits coupled to the phase region comparator and receiving the up-down decision signals and two OR circuits respectively coupled to the divided by N circuits.

15. The phase region decision circuit as claimed in claim 11, the phase region decision circuit further comprising a plurality of phase region comparators generating the up-down decision signals according to the over-sampled input data, first and second voters respectively generating a voting result according to the up-down decision signals, and two divided by N circuits respectively coupled to the first and second voters, wherein the voting result of the first voter comprises:
- a first up voting signal, having a value of 1 if a sum of the first up signals exceeds the first down signals and a value of 0 if the sum is the same;
- a first down voting signal, having a value of 1 if a sum of the first down signals exceeds the first up signals and a value of 0 if the sum is the same; and
- the voting result of the second voter comprises:
- a second up voting signal, having a value of 1 if a sum of the second up signals exceeds the second down signals and a value of 0 if the sum is the same;
- a second down voting signal, having a value of 1 if a sum of the second down signals exceeds the second up signals and a value of 0 if the sum is the same.

16. A phase region decision circuit for receiving an un-voted and over-sampled input data from a sampling circuit; the sampling circuit including a sampler and an XOR for checking data transition, the sampler over-sampling k*B bits per cycle from a serial input data stream according to a sampling clock signal, the phase region decision circuit coupled to a multiplexer, selecting data of B bits from the over-sampled input data, and comprising:
- a phase region comparator for generating at least one set of up-down decision signals including a first up signal, a first down signal according to the over-sampled input data;
- a statistical circuit coupled to the phase region comparator receiving the set of up-down decision signals and generating a current phase status signal (CPS) to the phase region comparator for comparison and to the multiplexer for selectively outputting the over-sampled data from the sampling circuit corresponding to the current phase status signal (CPS)
- wherein the multiplexer selects the data sampled at a phase $\Phi n$ and the set of up-down decision signals comprise:
  - an up signal, having a value of 1 if a phase region of the oversampled input data is Rn1, wherein n1 is a modulus of nx1/k, nx1 is one of n−m+1, ... and n−m+1+ny1, and ny1 is one of 0, 1, ..., and m−1; and
  - a down signal, having a value of 1 if a phase region of the oversampled input data is Rn2, wherein n2 is a modulus of nx2/k, n×2 is one of n+m,n+m−1, ... and n+m−ny2, and ny2 is one of 0, 1, ..., and m−1;
- wherein a current region Rn is indicated by the current phase status signal and data transition of the serial input data stream occurs between $\Phi n-1$ and $\Phi n$, wherein n is one of 0, 1, ..., k−1 and m is an integer of (k−1)/2.

17. The phase region decision circuit as claimed in claim 16, the statistical circuit further comprising two divided by N circuits coupled to the phase region comparator and receiving the up-down decision signals and two OR circuits respectively coupled to the divided by N circuits.

18. The phase region decision circuit as claimed in claim 16, the phase region decision circuit further comprising a voter coupled between the sampling circuit and the phase region comparator to generate a voting result according to the over-sampled input data, the phase region comparator generating the up-down decision signals according to the voting result.

19. The phase region decision circuit as claimed in claim 18, the statistical circuit further comprising two divided by N circuits coupled to the phase region comparator and receiving the up-down decision signals and two OR circuits respectively coupled to the divided by N circuits.

20. The phase region decision circuit as claimed in claim 16, the phase region decision circuit further comprising a plurality of phase region comparators generating the up-down decision signals according to the over-sampled input data, a voter generating a voting result according to the up-down decision signals, and a divided by N circuit coupled between the phase region comparator and the phase status register, wherein the voting result of the voter comprises:
- a up voting signal, having a value of 1 if a sum of the up signals exceeds the down signals and a value of 0 if the sum is the same;
- a down voting signal, having a value of 1 if a sum of the down signals exceeds the up signals and a value of 0 if the sum is the same.

* * * * *